(12) United States Patent
Larsson

(10) Patent No.: US 7,082,159 B2
(45) Date of Patent: Jul. 25, 2006

(54) METHODS AND ARRANGEMENTS IN A TELECOMMUNICATIONS SYSTEM

(75) Inventor: Peter Larsson, Solna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 770 days.

(21) Appl. No.: 09/995,759

(22) Filed: Nov. 29, 2001

(65) Prior Publication Data

US 2002/0118771 A1 Aug. 29, 2002

(30) Foreign Application Priority Data

Nov. 29, 2000 (SE) .................................... 0004403

(51) Int. Cl.
H04B 17/00 (2006.01)
H04B 3/46 (2006.01)
H04Q 1/20 (2006.01)

(52) U.S. Cl. ...................... 375/224; 375/260; 375/295

(58) Field of Classification Search ................ 375/259, 375/267, 295, 299, 260, 224
See application file for complete search history.

(56) References Cited

U.S. PATENT DOCUMENTS 5,867,478 A 2/1999 Baum et al.
6,005,876 A 12/1999 Cimini, Jr. et al.
6,115,427 A 9/2000 Calderbank et al.

(Continued)

FOREIGN PATENT DOCUMENTS

EP 0903898 A2 3/1999

(Continued)

OTHER PUBLICATIONS

Won Gi Jeon et al: "An efficient channel estimation technique for OFDM systems with transmitter diversity", Proceedings of 11th Internaitonal Symposium on Personal, Indoor and Mobile Radio Communication, vol. 2, Sep. 18-21, 2000, pp. 1246-1250, XP002175336, London, UK. p. 1246, paragraph 1; p. 1249, paragraph 2.

(Continued)

Primary Examiner—Jean B. Corrielus
(74) Attorney, Agent, or Firm—Roger Burleigh

(57) ABSTRACT

A method and apparatus in a wireless communication system comprising at least one transmitter provided with at least two antennas and at least one receiving unit provided with at least one antenna and wherein training sequences are transmitted from the at least two antennas of the at least one transmitter to the at least one antenna of the at least one receiving unit. Characterized in that first, prior to the transmission, a training sequence P(k) is Inverse Discrete Fourier Transformed to a sequence p(n). Second, for each antenna branch the Inverse Discrete Fourier Transformed sequence p(n) is cyclically rotated by a predetermined step, said predetermined step being p(n) is cyclically rotated by a predetermined step, said predetermined step being different for each antenna branch to generate cyclically rotated training sequences p(n–n1), p(n–n2). Third, the cyclically rotated training sequences p(n–n1), p(n–n2) are transmitted concurrently from said at least two antennas to the receiving unit. Fourth, at the receiving unit receiving the cyclically rotated training sequences, the received sequences being a superposition of transmitted training sequences, each individually affected by the propagation medium, are used to provide channel impulse response estimates for the transmission from respective antenna.

27 Claims, 6 Drawing Sheets

U.S. PATENT DOCUMENTS

| | | | |
|---|---|---|---|
| 6,131,016 A | 10/2000 | Greenstein et al. | |
| 6,144,711 A | 11/2000 | Raleigh et al. | |
| 6,243,423 B1* | 6/2001 | Sakoda et al. | 375/262 |
| 6,351,499 B1* | 2/2002 | Paulraj et al. | 375/267 |
| 6,633,614 B1* | 10/2003 | Barton et al. | 375/264 |
| 6,654,431 B1* | 11/2003 | Barton et al. | 375/346 |
| 6,888,899 B1* | 5/2005 | Raleigh et al. | 375/299 |
| 2002/0041635 A1* | 4/2002 | Ma et al. | 375/267 |
| 2002/0176485 A1* | 11/2002 | Hudson | 375/144 |
| 2003/0043887 A1* | 3/2003 | Hudson | 375/144 |
| 2005/0195915 A1* | 9/2005 | Raleigh et al. | 375/267 |

FOREIGN PATENT DOCUMENTS

EP    1047209 A1    10/2000

OTHER PUBLICATIONS

Li Y et al: "Channel Estimation for OFDM Systems With Transmitter Diversity in Mobile Wireless Channels", IEEE Journal on Selected Areas in Communications, IEEE Inc. New York, US. vol. 17, No. 3, Mar. 1999, pp. 461-470, XP000804975.

* cited by examiner

METHODS AND ARRANGEMENTS IN A TELECOMMUNICATIONS SYSTEM

FIELD OF INVENTION

The present invention relates to communication, and primarily to wireless communication.

DESCRIPTION OF RELATED ART

In a radio communication system, a bitstream or a symbol stream is sent on a radio channel from a transmitter to a receiver. Physical limitations of wireless channels, such as bandwith limitations, propagation loss, interference, multipath fading, inter symbol interference and time variance, present a fundamental challenge to reliable communication. Further challenges come from power limitation, size, and speed of devices that are employed within portable wireless apparatus.

It is well known for a man skilled in the art that in most scattering environments, antenna diversity, i.e. the usage of multiple transmitting and/or receiving antennas, is the most practical technique for reducing the effect of multipath fading. The diversity technique involves the provision of a number of replicas of the transmitted signal to the receiver, some replicas being less attenuated by fading.

In a conventional serial data system, the symbols are transmitted sequentially on a channel, the frequency spectrum of each data symbol being able to occupy the entire available bandwidth.

A problem with serial transmitting methods in radio communication systems is that multipath reception having different delayed signals, due to different transmission paths, may result in Inter Symbol Interference, ISI. This occurs when signals being delayed, due to e.g. reflections, and having a non-negligible strength, are received having a time difference as long as a data symbol or longer. The most common solution to this problem is the usage of an equalizer at the receiver. Based on estimates of channel attenuation, delay and phase of a channel, the equalizer tries to compensate the received signal for impact from the channel. In the time domain, the complex attenuation and delay description of a channel is called channel impulse response. The channel impulse response also enables the measurement of how the received energy is scattered over time by calculating a delay power spectrum. The range of time of which the delay power spectrum is essentially zero is called delay spread. A problem in the case of single carrier in a serial system, i.e. when the symbols are transmitted one by one after each other, is that for a given delay spread, the Inter Symbol Interference is provided over several symbols, requiring a more complex equalizer than in systems wherein the symbols are sent concurrently. High complexity in the algorithms requires more processing at the receiver, and thus high battery consumption, high clock rates, larger chip area, etc . . . It is therefore of great importance to keep the complexity low.

A parallel data transmission system offers possibilities for alleviating many of the problems encountered with serial systems. A parallel system is one in which several sequential streams of data are transmitted simultaneously, so that at any instant many data elements are being transmitted. In such a system, the spectrum of an individual data element normally occupies only a small part of the available bandwith. This is often denoted multi-carrier transmission.

Furthermore, the impact of a sudden short lasting impulse interference, e.g. sparks, is alleviated by the fact that the disturbance is spread over multiple channels, as the disturbance on each symbol is reduced. Hence, due to the dividing of an entire channel bandwith into many narrow sub-bands, the frequency response over each individual sub-band is relatively flat. Since each sub-channel covers only a small fraction of the original bandwith and hence the channel is flat, an equalization method is potentially simpler than in a serial system having ISI. A simple equalization algorithm and the implementation of differential encoding may make it possible to totally avoid equalization.

The invention is directed towards a system using Orthogonal frequency division multiplexing OFDM that can be simply defined as a form of multi channel modulation where its channel spacing is carefully selected so that each sub-channel is orthogonal to the other sub-channels. Thus parallel channels may be called multi-carrier.

In orthogonal frequency division multiplexing (OFDM), a channel is divided into many narrow parallel sub-channels, thereby increasing the time of an individual symbol and reducing or eliminating the inter-symbol interference (ISI) caused by the multipath environments. On the other hand, since the dispersive property of wireless channels causes frequency selective fading, there is a higher error probability for those sub-channels when deep fades occurs. Hence, techniques such as error correction codes and diversity have to be used to compensate for the frequency selectivity.

In order to provide good channel quality estimation, a pilot signal, i.e. a training sequence, is used. Here follows a more detailed disclosure on how a possible OFDM signal is transmitted and corrected for channel impairments.

In this disclosure, capital letters are used to denote frequency domain signals whereas lower case letters denote time domain signals. Furthermore, the indexes k and n are used for frequency and time domain indices, respectively.

First, for the purpose of coherent detection, a pilot signal is transmitted. A pilot is a sequence of symbols that are defined and well known in both transmitter and receiver. The pilot is denoted $P(k)$ and is a discrete sequence of complex symbols, which are indexed in frequency with the parameter k and ranges from 0 to N−1. Prior to the transmission, the pilot $P(k)$ is transposed into the time domain by an Inverse Discrete Fourier Transform IDFT resulting in a complex valued discrete pilot sequence in the time domain denoted $p(n)$, where n is a time index ranging from 0 to N−1. It should be noted that practically, an (Inverse) Fast Fourier Transform is used instead of an (Inverse) Discrete Fourier Transform, because it has lower algorithmic complexity and therefore requires less complex hardware. The pilot sequence is sent over the wireless channel modeled by the discrete and complex valued channel impulse response $h(n)$, which performs a linear filtering function of the sequence $p(n)$. The resulting received sequence is $r_p(n)$, which is discrete and complex valued:

$$r_p(n)=p(n)*h(n)+v(n), \text{ where}$$

v(n) is the noise added in the receiver or other ambient noise at the antenna input. The filtering process is identified by the sign * between the sequence p(n) and the discrete and complex channel impulse response h(n). It is a so-called convolution.

In an OFDM system, the signals are mainly processed in the frequency domain. Therefore, the received N sample sequence is Discrete Fourier Transformed (the opposite of Inverse Discrete Fourier Transform) resulting in $R_p(k)=P(k) \cdot H(k)+V(k)$, where the sequence P(k) is a known sequence, whereas V(k) is a random sequence and therefore best modeled as a stochastic process. H(k) is a channel transfer function which is unknown prior to the transmission. V(k) is noise and therefore random.

It should be noted that the convolution * is transformed into a multiplication under the Discrete Fourier Transformation. Due to implementation reasons (i.e. complexity) a Discrete Fourier Transform is seldom performed but instead an equivalent lower complexity, so called Fast Fourier Transform, is carried out. The equivalent is done for Inverse Discrete Fourier Transform, i.e. the Inverse Fast Fourier Transform is used.

An estimate of the function H(k), which is required for an equalization step, is searched. Based on the received signal $R_p(k)$, and prior knowledge of the sequence P(k) the function H(k) can be determined according to:

$$\hat{H}(k) = \frac{R_p(k)}{P(k)}$$

It should however be noted that this is only an estimate, since noise is present. If the noise level is low in comparison to the received signal of the sequence $R_p(k)$, the estimation of the channel is precise. On the other hand, if the noise level is high, the estimation is poor.

When the channel has been estimated, data can be transmitted. The data sequence (discrete and complex valued) is denoted S(k), where k is the frequency index ranging from 0 to N−1. Prior to the data transmission, the sequence S(k) is Inverse Discrete Fourier Transformed, or preferably Inverse Fast Fourier Transformed to a time representation s(n), which is discrete and complex valued. It is assumed that the time elapsed since the channel estimation was performed is so short that the channel characteristics have not undergone any significant change.

Accordingly, when the sequence s(n) is transmitted, it will experience the same channel characteristics as the pilot signal did. Of course, the noise is different at reception, which is here indicated with w, instead of v.

$r_s(n)=s(n)*h(n)+w(n)$

When the received signal has been Discrete Fourier Transformed, or preferably Fast Fourier Transformed, the following signal is obtained $R_s(k)=S(k) \cdot H(k)+W(k)$ As the channel is known, the sequence S(k) can be estimated as $$\hat{S}(k) = \frac{R_s(k)}{\hat{H}(k)} = \frac{R_s(k) \cdot P(k)}{R_p(k)}$$

If desired, more data symbols can now be sent. At each time instant, the channel estimation is used to compensate for channel impairments, i.e. equalization. However, the channel characteristics are likely to change over time and therefore may new pilot signals be sent regularly having a fixed time interval.

However, a man skilled in the art understands that the disclosure above is related to an extremely trivial case. In practice, this is probably not the way equalization would be performed. Instead, equalization is often an integral part of forwarding error correction decoding. Furthermore, a particular a priori knowledge of the channel, such as delay spread or statistical characteristics, can be used to improve the quality of the channel estimate which in turns improves the quality of the estimated data S(k).

Transmitter diversity, i.e. the usage of at least two transmitter means, such as transmitting antennas, is an effective technique for combating fading in mobile wireless communications, especially when receiver diversity, i.e. the usage of at least two receiver means, such as antennas, is expensive or impractical.

The performance gain of linear transform based diversity with ideal maximum likelihood sequence estimation (MLSE) and an arbitrary number of transmitter antennas is investigated and compared to receiver diversity in the article by J. H. Winters "The diversity gain of transmit diversity in wireless systems with Rayleigh fading", Proc. 1994 IEEE Int Communications Conf, Chicago, Ill., June 1994, pages 1121–1125.

The published International patent application WO 99/14871 discloses a transmit diversity method for wireless communication. In one illustrative embodiment, two transmit antennas and a single receive antenna are used, providing the same diversity gain as maximum-ratio receiver combining scheme with one transmit antenna and two receive antennas.

More recently, space time coding has been developed for high data rate wireless communication. Space time coding schemes are based on coding signals in time as well as space, i.e. over multiple transmit antennas. Typically, a number M of transmit antennas and a number N of receive antennas are employed. In the article by G. Foschini, "Layered space-time architecture for wireless communication in a fading environment when using multi-element antennas", Bell Labs Technical Journal Autumn 1996, the author describes a multiple transmit and receive antenna system for which the channel capacity scales linearly with the minimum number of employed antenna at the transmit and receive side. It should be noted that transmitter diversity is sometimes classified under the field of space time coding although merely a single antenna is employed at the receiving side. In the latter context, it is clear that space time coding may alternatively to high channel capacity instead be exploited for increased robustness performance under e.g. fading conditions as transmit diversity methods mainly address.

In the article by D. Agarwal et. al. "Space-time coded OFDM for high data rate wireless communication over wideband channels", Proc. 48$^{th}$ IEEE Vehicular Technology Conf., Ottawa, Canada, May 1998, pp. 2232–2236, space-time coding with OFDM has been studied. However, decoding space time codes requires channel state information, which is usually difficult to obtain, especially for time-variant channels having dispersive fading. Said paper assumes ideal channel state information.

Another article, also studying space time coding in OFDM having assumed known channel state is A. Van Zelst et al. "Space division multiplexing (SDM) for OFDM systems" presented at VTC 2000.

In the article "On channel estimation in OFDMA systems" by Jan-Jaap Van de Beek et al. in proceedings IEEE Vehicular Technology Conf. Vol. 2, July 1995, page 815–819, methods are disclosed for channel estimation in OFDM with one transmitter antenna. Minimum Mean Square Error (MMSE) and Least Square (LS) estimators with reduced complexity are developed that exploit the assumption of finite length impulse response. They also address the issue of spectral leakage for a discrete time channel impulse response in a channel having continuous path delays. Considering the aspect of single transmit antenna channel estimation, the drawback of the proposed methods are that the algorithmic complexity could be reduced even further with preserved performance.

For OFDM systems using space-time coding, two or more different signals are transmitted from at least two different antennas simultaneously. The received signal is the superposition of these signals, usually having the same average power. If the channel parameters corresponding to each transmitter and receiver antenna pair, in a system comprising at least two transmitting antenna and at least one receiving antennas are estimated by the approach developed previously in the article by Y. Li et al. "Robust channel estimation for OFDM systems with rapid dispersive fading channels", IEEE Trans. Commun, Vol. 46, pp 902–915, July 1998, the signals from other transmitter antenna(s) will create interference. The signal-to-interference ratio will always be very poor, and the MSE (Minimum Square Error) of the estimation will therefore be very large. Hence, novel-parameter estimation approaches are desired for transmitter diversity using space-time coding.

A simple channel estimation for multiple transmit antennas is presented in the article by N. Seshadri et al. "Two signaling schemes for improving the error performance of frequency selective division duplex transmission systems using transmitter antenna diversity" in Int. Journal of wireless information networks, Vol. 1, No. 1, 1994. The authors propose a method for channel learning where one pilot sequence is multiplexed in time and over at least two antennas. Hence the pilot is sent on antenna 1 first, antenna 2 second and so on. The shortage of this method is that resources are occupied of sending training sequences instead of data.

In the article by Ye (Geoffrey) Li et al., "Channel estimation for OFDM systems with transmitter diversity in mobile wireless channels", IEEE Journal on selected areas in communications, Vol. 17, No. 3, March 1999, the parameter estimation for OFDM systems having transmitter diversity is disclosed in detail. In said paper transmitter diversity using space-time coding for OFDM systems is studied. The channel parameter estimation approach is developed. The channel parameter estimation is crucial for the decoding of space-time codes, and the MSE bound for these estimation approaches is derived. Therefore, OFDM systems having transmitter diversity using space-time coding can be used for highly efficient data transmission over mobile wireless channels. However, the deficiency of the method disclosed in the above article is that the proposed estimation technique is very complex. The structure of the transmitter and associated signals is not discussed at all.

SUMMARY OF THE INVENTION

A problem with some existing methods for channel estimation in space time coded systems is that the existing methods consume a lot of bandwith since a training symbol is sent for each transmit antenna.

A further problem with at least one state of the art method using concurrent channel training sequences transmissions is that a preferred estimation technique is very complex both from algorithmic and hardware implementation point of view.

The present invention relates to a method for providing multiple channel estimation in the field of space time coding in a radio communication system. Space time coding includes transmitter diversity, space(-time) multiplexing and other complex use of signal coding in time and space.

The inventive solution of the problems is to send pilot signals concurrently instead of consecutively in order to increase bandwith efficiency during a multitude of channel transfer functions in OFDM and doing so, guaranteeing non-interfering channel estimates at low processing cost for both transmitter and receiver side, in relation to prior art.

A purpose of the invention is to provide a channel estimation technique, which is very bandwith efficient.

A further purpose of the invention is to provide a channel estimation method having a low delay and being very processing efficient.

A yet further purpose of the invention is to ensure orthogonal and independent channel estimate for up to N transmit antennas, the number N being the number of sample values used in the receiver and the N channels being frequency flat.

A further purpose of the invention is to reduce hardware complexity when providing channel estimation in OFDM-systems.

A yet further purpose of the invention is to attenuate unwanted noise.

Another purpose of the invention is to be able to provide a low complexity and robust channel estimation method for a single transmitter antenna case in addition to the more general multiple antenna scenario.

An advantage of the invention is that it is bandwith efficient, since merely one synchronization symbol time slot is required for multiple channel transfer estimations.

An advantage of the invention is that it is latency and processing efficient, since the major parts of the processing of the independent channel estimates, per antenna, are performed concurrently.

A yet further advantage of the invention is that orthogonality is implicitly ensured for up to N transmit antennas by using the coding by N times (Inverse) Fast Fourier Transforms provided that no channel delay spread exists. This is always true disregarding actual content in the training sequence P(K), which therefore may be optimized for any other purpose, e.g. low peak to average ratio.

A further advantage of the invention is that hardware complexity is very low, since the major part of the processing relies on hardware functions inherent for a modem used in a OFDM system.

A yet further advantage of the invention is that the channel estimates are very exact due to the stuffing with zeros where noise is prevalent that acts as a noise attenuation mechanism.

The term "comprises/comprising" when used in this specification is taken to specify the presence of stated features, integers, steps or components but does not preclude the presence or addition of one or more other features, integers, steps, components or groups thereof.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The invention will now be described in more detail with reference to preferred exemplifying embodiments thereof and also with reference to the accompanying drawings, in which.

DETAILED DESCRIPTION

Figure 1:
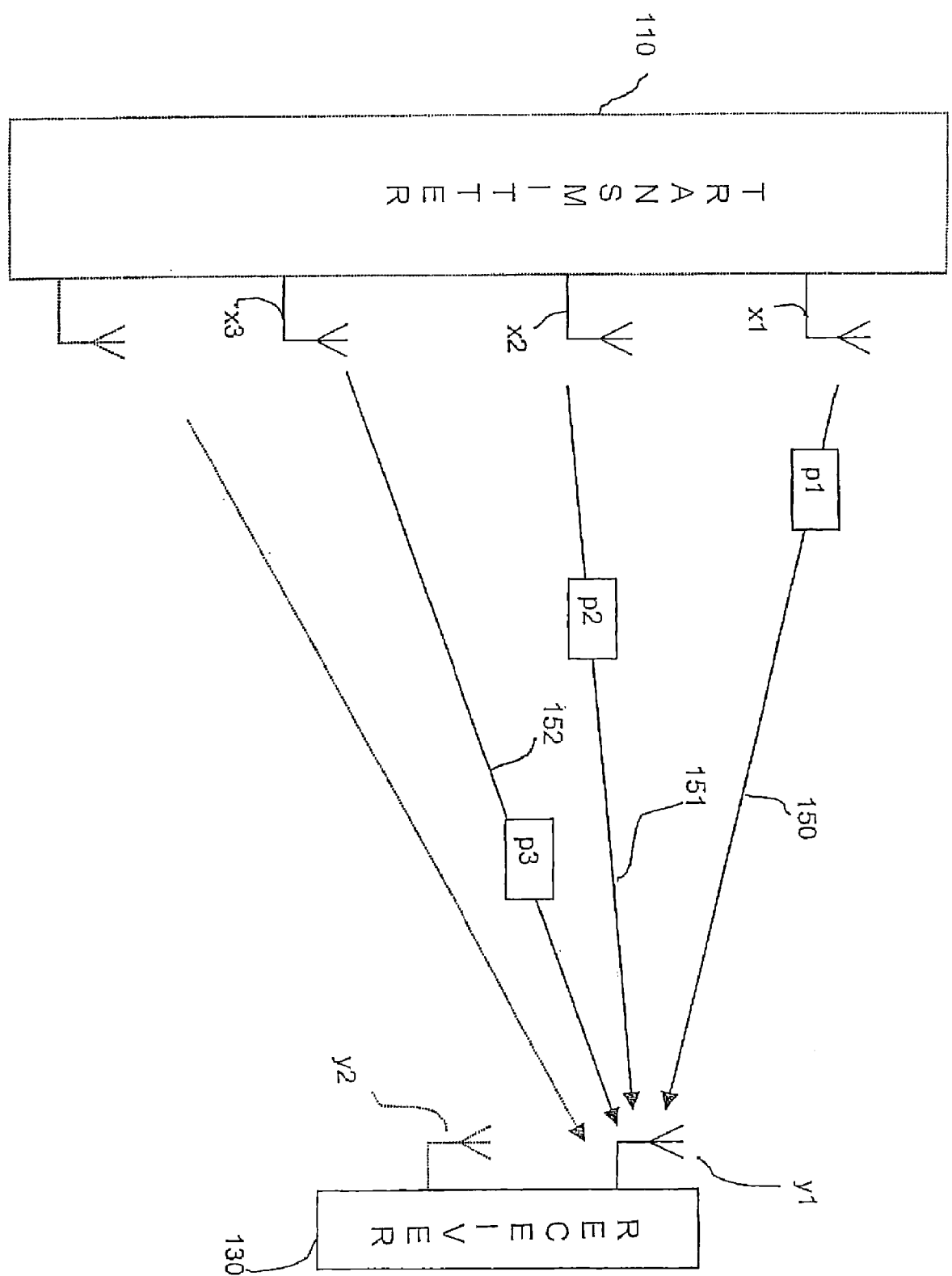
FIG. 1 is a schematic view illustrating pilot signals being sent separately typical for a state-of-the-art method.

In FIG. 1 is depicted a communication system, wherein training sequences are transmitted sequentially in an OFDM system comprising several transmitting antennas. The training sequences are transmitted in such a way that they do not overlap each other over time. The system comprises a transmitter 110 provided with antennas x1, x2, x3. In FIG. 1, though only three antennas x1, x2, x3 are shown, a man skilled in the art understands that more than three antennas may be used. The system also comprises at least one receiver 130 provided with at least one receiving antenna y1, y2. FIG. 1 illustrates a state-of-the-art approach of performing multiple channel estimates in OFDM. Several training symbols p1, p2, p3 are sent one by one after each other from the different antennas x1, x2, x3 to a receiving antenna y1 on channels 150, 151, 152.

Figure 2A:
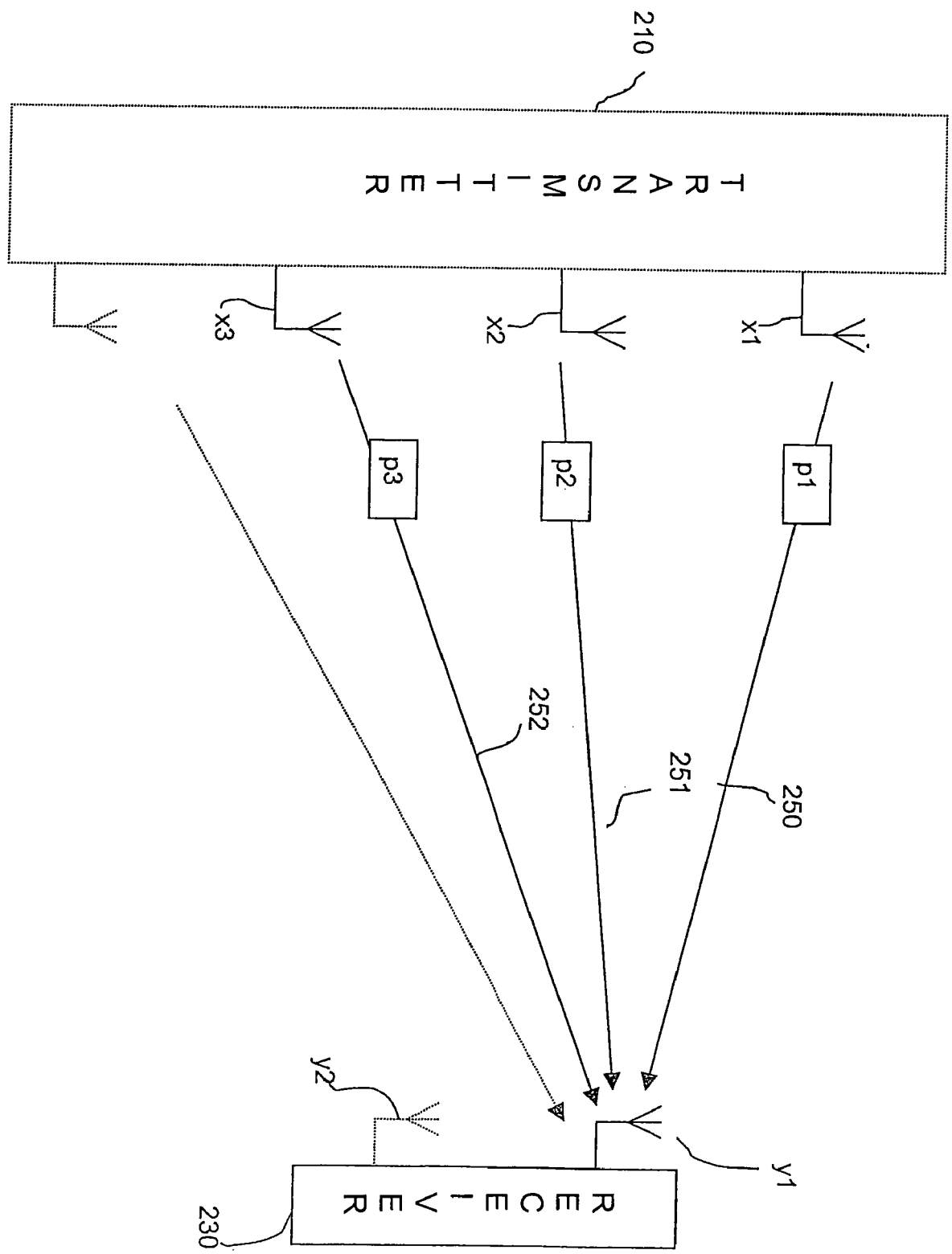
FIG. 2a is a schematic view illustrating pilot signals being sent concurrently.

In FIG. 2a is illustrated a system according to the invention as well as one state of the art method. The system provides a multitude of multiple training sequences that are transmitted at the same time. The OFDM system in FIG. 2a comprises a transmitter 210 provided with antennas x1, x2, x3 and at least one receiver 230, e.g. a wireless terminal, provided with at least one antenna y1. Training sequences p1, p2, p3 are sent concurrently from the antennas x1, x2, x3 to the receiving antenna y1 on channels 250, 251, 252. In contrast to the state of the art method, the invention uses training sequences p1, p2, p3 having a mathematical relationship with each other enabling distinguishing estimates in an optimal and simple manner.

Figure 2B:
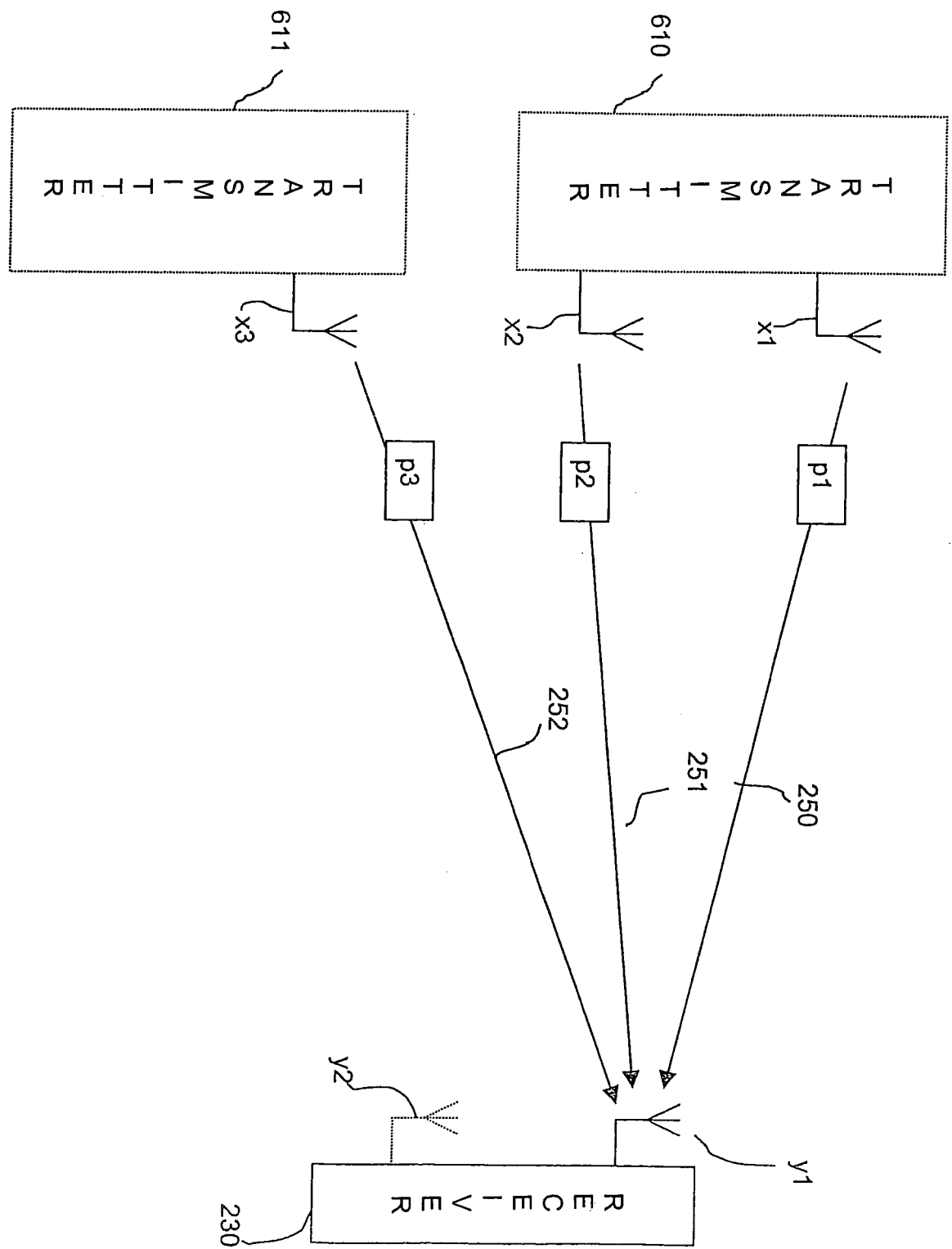
FIG. 2b is a schematic view illustrating pilot signals being sent concurrently from different nodes.

In FIG. 2b is illustrated a system according to the invention. The system provides a multitude of multiple training sequences that are transmitted at the same time. The OFDM system in FIG. 2b comprises a transmitter 610 provided with antennas x1, x2, and a transmitter 611 provided with an antenna x3, and at least one receiver 230, e.g. a wireless terminal, provided with at least one antenna y1, y2. Training sequences p1, p2, p3 are sent concurrently from the antennas x1, x2, x3 to the receiving antenna y1 on channels 250, 251, 252.

Figure 3:
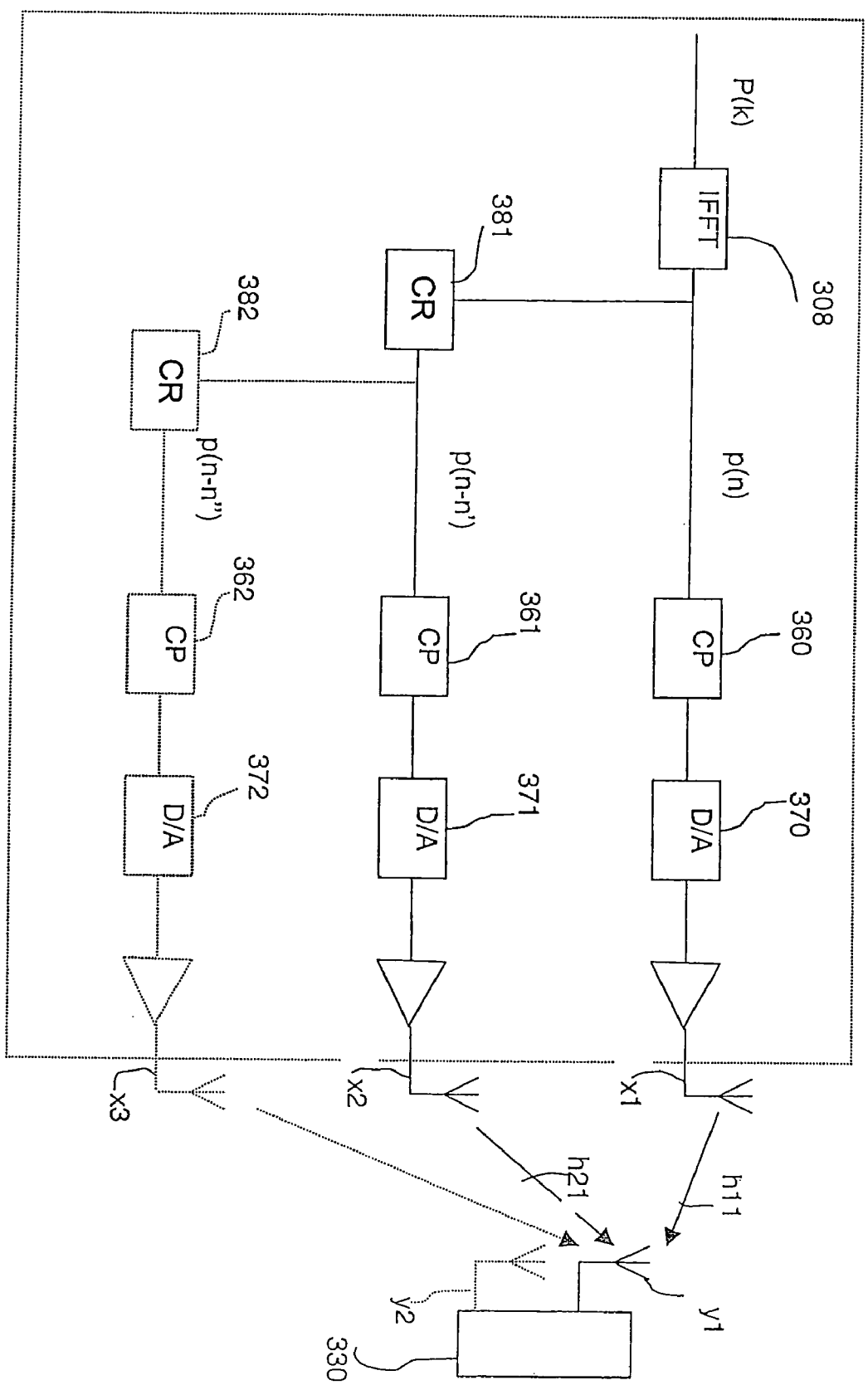
FIG. 3 is a schematic view illustrating the usage of cyclic rotation according to the invention.

FIG. 3 illustrates transmission of pilot signals according to the invention. A known channel estimate sequence P(k) in the frequency domain is provided to a block 308. In the block 308, the sequence P(k) is Inverse Fast Fourier Transformed to a sequence p(n). The sequence p(n) is fed to a block 360, to a block 381 and to a block 382. In the block 360, a cyclic prefix CP is inserted to precede the sequence p(n). In a further embodiment, a cyclic suffix could be used. The cyclic prefix CP mitigates intersymbol interference (ISI) effects. Then the sequence p(n) is provided to a Digital-to-Analog (D/A) converter 370 where it is converted to an analog signal. Then the D/A converted sequence p(n) is provided to a first antenna x1. In the block 381, the sequence p(n) is cyclically rotated (CR) by a predetermined step comprising a predetermined number n' of positions in the sequence and thereby transformed to a sequence p(n−n'). Thereby, the sequence p(n−n') is provided to a block 361. In block 361, a cyclic prefix CP is inserted to precede the sequence p(n−n'). Thereafter, the sequence p(n−n') is provided to a Digital-to-Analog converter 371 where it is converted from a digital to an analog shape. Then the D/A converted sequence p(n−n') is provided to a second antenna x2. The two sequences are then transmitted concurrently from the antennas x1 and x2 to a wireless terminal 330 provided with at least one antenna y1, y2. In an embodiment comprising three antennas, the training sequence p(n) is in the block 382 cyclically rotated by a second predetermined step comprising (n''−n') positions in the sequence and thus transformed to a sequence p(n''). The sequence p(n−n'') is thus provided to a block 362. In block 362, a cyclic prefix CP is inserted to precede the sequence p(n−n'). Thereafter, the cyclically extended sequence p(n−n') is provided to a Digital-to-Analog converter (D/A) 372 where it is converted from a digital to an analogue shape. Then the D/A converted sequence p(n−n') is provided to a third antenna x3. The three sequences are then transmitted concurrently from the at least one antenna x1, x2 and x3 to the wireless terminal 330 provided with the antenna y1. A man skilled in the art understands that the inventive system may comprise more than three antennas.

The received discrete time signal for two transmit antennas and one receive antenna is:

$$r_1(n)=p(n)*h_{11}(n)+p(n-n')*h_{21}(n)+v_1(n)$$

$h_{11}$ and $h_{21}$ are channel impulse responses, and
$v_1$ is a noise source associated with the receive antenna.

A result similar to a cyclic convolution is obtained when an N point portion is cut out from an OFDM symbol, i.e. the removal of the cyclic prefix, after the last signal representing the previous symbol has arrived. The integer N defines the number of positions in a Fourier Transformation.

Then, in the discrete frequency domain, the sequence $r_1(n)$ is by means of a Fast Fourier Transform transformed to $$R_1(k)=P(k)\cdot H_{11}(k)+P(k)\cdot e^{(i\cdot 2\cdot \pi\cdot n'\cdot k)/N}\cdot H_{21}(k)+V_1(K)$$

The sequence $R_1(k)$ can now be divided by the known training sequence P(k). The cyclic delay n' dependent phase term remains and can mathematically be associated with $H_{21}(k)$. A subsequent Inverse Fast Fourier transform returns a composite channel impulse response estimate, $$h_{comp}(n)=h_{11}(n)+h_{21}(n-n')+v_1(n)$$

Figure 4:
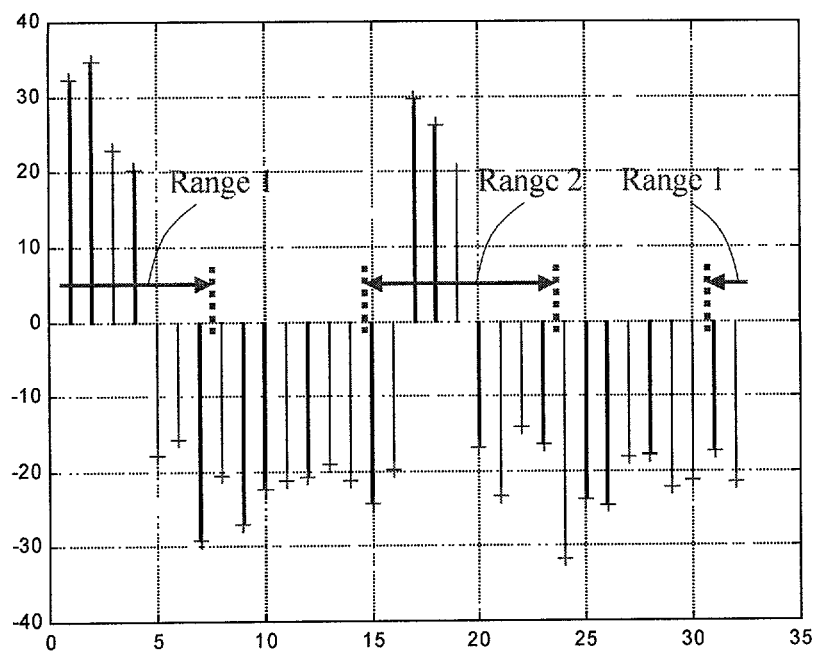
FIG. 4 is a diagram illustrating a composite channel impulse response estimate provided with some added Gaussian noise.

Now, a commonly used constraint in OFDM is that the cyclic prefix length should be slightly longer than the longest duration of a channel impulse, i.e. delay spread. In addition, the OFDM symbol duration is often chosen in order to enable the cyclic prefix to add maximally 20–25% overhead, but preferably less than that as both energy and efficiency is consumed. Provided that the number of cyclic positions shift n' between the two antenna paths is greater than the length of the cyclic prefix CP, the channel impulse responses $h_{11}$ and $h_{21}$ are guaranteed to be extracted individually from a composite channel impulse response estimate $h_{comp}$. An example of the magnitude (or real or imaginary part) in dB of a composite channel impulse response estimate $|h_{comp}|$ having some added Gaussian noise is indicated in FIG. 4. In the example illustrated in FIG. 4 $h_{11}$ and $h_{21}$ are 4 and 3 point long respectively, and N=32.

Figure 5:
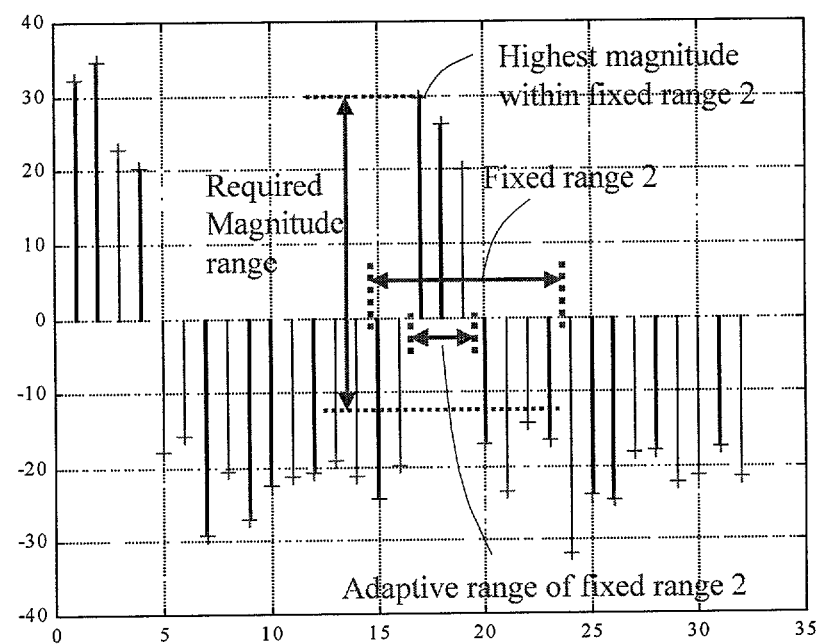
FIG. 5 is a diagram illustrating further method according to the invention.

The individual channel impulse responses are easily extracted from the received signal since the cyclic shift of n' positions is known, and the extraction can be made as illustrated by examples shown in FIGS. 4 and 5. The cyclic shift of n' positions for the individual channel impulse responses must be removed prior they are used for equalization of the channels. Then, the channel impulse response corresponding to $h_{21}$ is cyclically shifted n' positions in the opposite direction compared to the direction in which the associated pilot sequence originally was shifted, as this unfolds the phase wrapping on the corresponding channel transfer function, else being incurred by the cyclic shift. A cyclic shift is performed in a vector having N positions, the last position, or the two last positions being put at the beginning of the vector, and the other positions being shifted to the right, clockwise. In a further embodiment the positions are shifted counterclockwise. For each individual channel impulse response, positions being considered irrelevant or having non-significant energy are replaced with zero values, alternatively, each individual channel impulse response being more smoothly attenuated by a smother windowing function, see FIGS. 4 and 5. A man skilled in the art understands that the replacement of only noise dependent parts of the channel impulse responses with zero results in a significant reduction of noise and therefore provides for excellent estimation. For each channel estimate, noise may be reduced with roughly $10\cdot\log_{10}(N/\text{delay spread})$dB. The delay spread indicates the extent of the energy dispersion from different multipath components, i.e. the greater the delay spread, the later arrives the last multipath component. Two methods for separating two channel impulses responses will now be described with reference to FIGS. 4 and 5. The channel impulse response has about the same length as the cyclic prefix.

The first method is illustrated by the diagram in FIG. 4. According to the first method, a plurality of fixed ranges is defined in the discrete time domain. The number of fixed ranges is equal to the number of transmit antennas and are upper limited to floor (N/CP duration). Floor is a mathematical function choosing the closest lower integer value of the argument. From each of said ranges, one channel impulse response is extracted. For example, in range 1, a number of positions have amplitudes in the composite channel impulse sequence significantly stronger than other positions. The strong channel impulse responses are of interest for the inventive method.

As the cyclic shifts are well known to both the transmitter and the receiver, the receiver knows when to expect the start of the ranges. As the receiver also knows the length of the cyclic prefix, it also knows the end point of each range. The span of the range is at least the length of the cyclic prefix having additional extension to protect from leakage. It is assumed that the timing synchronization for the Fast Fourier Transformation window start has been performed at the preceding timing synchronization step. However, small errors in timing are acceptable, due to the fact that said errors are transposed to a small time shifts in the composite channel impulse response and thus each channel impulse response is kept within each individual range. Very large timing synchronization errors may require larger ranges in order to accommodate protection for such imperfections in preceding steps.

It should be noted that the leakage and significant timing errors may rotate into the end of the composite channel impulse response due to cyclic properties of the Fast Fourier Transformation. The leakage explains why range 1 extends cyclically into the end of the composite channel impulse response. When creating the channel impulse response corresponding to range 1 in the composite channel impulse response, positions of range 1 are copied, whereas the positions outside the range 1 are set to 0. The positions outside range 1 have insignificant contributions to the channel impulse response $h_{11}$ and may therefore be set to zero.

For channel impulse response within range 2, which are the results of a rotation of the training sequence p by n' positions, the extraction follows the same procedure as for the range 1. However, the resulting channel impulse response sequence for range 2 is cyclically shifted back n' positions in such a way that most of the energy is gathered at the beginning of the channel impulse response.

For an embodiment using more than two antennas at the transmitter end, the same procedure is performed, but having different range values and subsequent cyclic rotation. Those values depend on how the cyclic shift is performed for the transmission of respective cyclic rotated training sequence.

A further method is illustrated by the diagram of FIG. 5. This method comprises an additional step. This method employs a more intelligent and adaptive mechanism. For each range, a first position having the maximum magnitude within the fixed range is determined. Thereafter, second and third positions are determined, being the furthermost positions within the range on the respective side and away from the first position also having a predetermined lower threshold with respect to the first position. The adaptively chosen subset from the fixed range is copied, whereas the remaining positions are set to zero. This step is performed for each fixed range. The figure shows the case for the fixed range 2. A cyclic rotation is performed in the same way as the embodiment disclosed in connection with FIG. 4. It should be noted that if all magnitudes are within the predefined magnitude difference, the entire range will stay unaltered.

A man skilled in the art understands that the above disclosed scheme may be used for a greater number of transmit antennas. However, at most the cyclic prefix CP, floor (N/CP duration), undisturbed channel transfer function, i.e. transmission over channels having a minimum of interference, can be guaranteed per receiving antenna. In addition, some guard positions must be left between the individual channel impulse responses due to leakage from non-whole point delays.

In a further embodiment of the invention, additionally windowing is used in order to minimize the effect of Fast Fourier Transform leakage when path delays are intermediately placed between sampling points. Leakage is an inherent characteristic of the (I)DFT process when the real, i.e. continuous, world is sampled and results in some interference leakage to neighboring sample points. One such real world effect is e.g. that path delays may be somewhere intermediately placed between the sampling instances. In one embodiment of the windowing, a window function is applied in the frequency domain after the division by the sequence P(k), but prior to the IFFT to the composite channel impulse response and subsequent channel impulse response partitioning. After the partitioning each channel estimate should be compensated for the effects of the performed windowing by performing inverse windowing.

A well known window function is the Hanning window also called Raised cosine window. In a preferred embodiment, the Hanning windowing in the frequency domain is replaced by a corresponding time domain filter operation on the composite channel impulse response according to $h_{comp\_windowed}(n)=h_{comp}(n)/2-h_{comp}(n-1)/4-h_{comp}(n+1)/4$, where the delay corresponds to cyclic shifts of $h_{comp}(n)$. This signal processing trick allows low complexity implementation of the frequency domain Hanning window operation.

Figure 6:
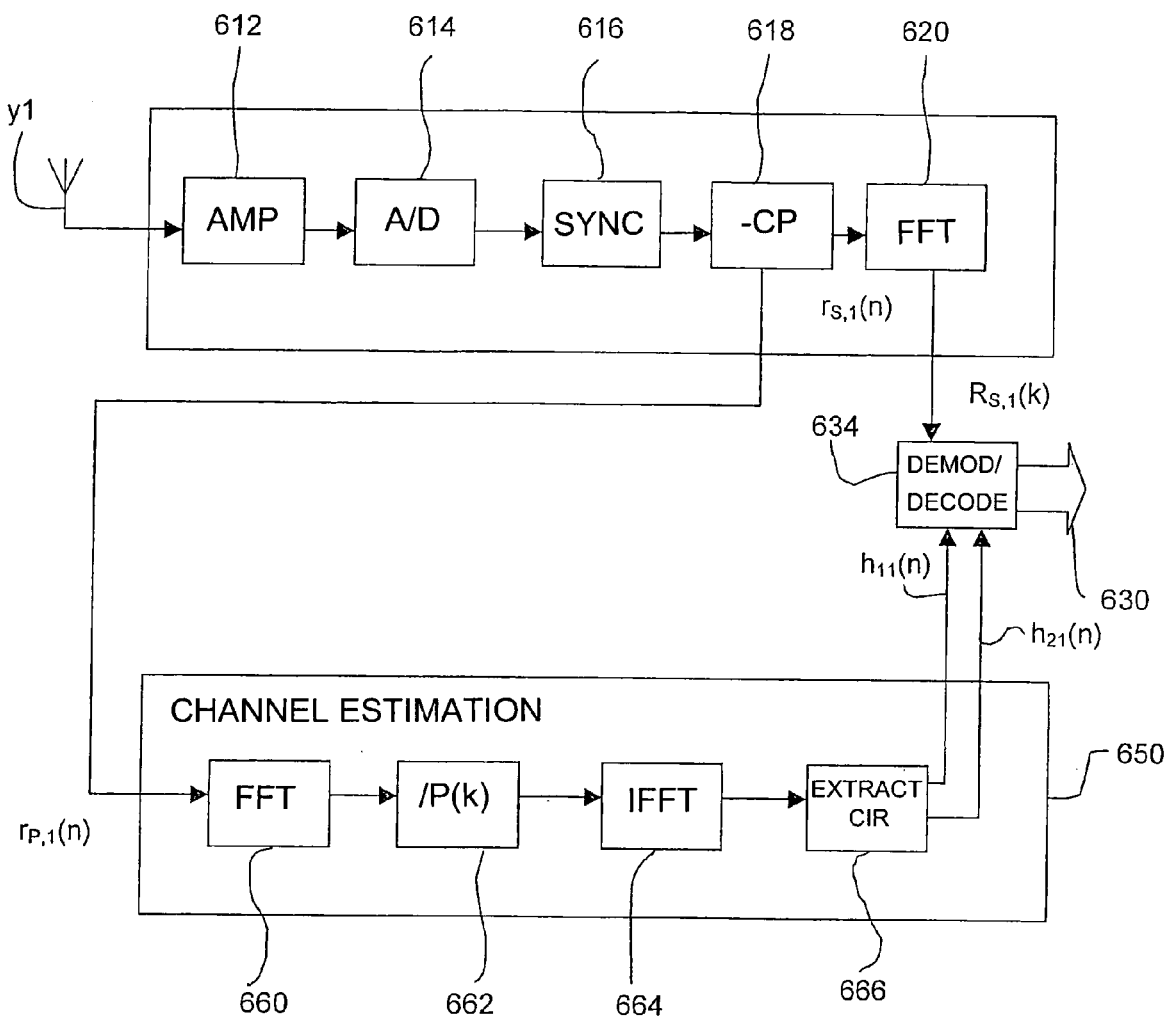
FIG. 6 is a schematic view illustrating the process at the receiving antenna.

In an embodiment of the invention comprising four transmitting antennas the composite channel impulse response estimate becomes $$H_{comp}(n)=h_{11}(n-n')+h_{21}(n-n_2')+h_{31}(n-n_3')+h_{41}(n-n_4')+w_1(n)$$

n defines the cyclic rotation, wherein $n_1' \neq n_2' \neq n_3' \neq n_4'$, and preferably $n_1'=0$, $n_2' \geq n_1'+CP\_duration$, $n_3' \geq n_2'+CP\_durat$ $n_4' \geq n_3'+CP\_duration$ and $n_4' < N\-CP\_duration$, It should be noted that only two Fast Fourier Transformations are required in block 666, FIG. 6, i.e. one Inverse and one ordinary Fast Fourier Transformation. In a further embodiment, the individual extracted channel impulse responses are Fast Fourier Transformed to their respective frequency domain representation $H_{x,y}(k)$ under the assumption that block 634 in FIG. 6 operates with channel transfer functions.

Practically a full Fast Fourier Transformation is used. However, in a further embodiment, for each individual channel impulse response, the last Fast Fourier Transformation is of a reduced type, since the major content is zeros. A traditional (Inverse) Fast Fourier transformation can remove some operations, when part of the input signals are known to comprise zeros, as is well known for a man skilled in the art. Alternatively the frequency response may be generated directly from the DFT definition when the number on non-zero elements in $h_{comp}(n)$ are few.

Moreover, if the receiver exploit multiple receiving antennas, as is indicated in FIG. 3 the inventive process can be performed independently for each antenna.

Now, a receiver structure for OFDM will be disclosed with reference to FIG. 6. In FIG. 6, only one antenna is illustrated. However, a man skilled in the art understands that multiple antennas may be used. Signals are received at the antennas y1, y2 ... yJ, where J is an integer ranging from 1 and upwards limited only by practical concerns such as space, power consumption, cost etc. In FIG. 6 only the first antenna y1 is shown. The signal received at the antenna y1 is provided to a block 612, where it is amplified (AMP) to an appropriate level for reception by means of an amplifying stage, often with Automatic Gain Control (AGC). Then, the amplified signal is provided to a block 614, being an A/D converter, where the signal is converted from an analog shape to a digital shape and samples are taken of the received amplified signal at successive times. Then, the digital signal is provided to a block 616, where frequency and OFDM timing synchronization (SYNC) is performed. The timing synchronization is often based on particular training symbols for this specific purpose, but other methods known for the man skilled in the art may be used. When the timing synchronization has been performed, the signal Is provided to a block 618, where the cyclic prefix (OP) is removed. A discrete and complex valued sequence $r_{p,1}(n)$ comprising training information is provided from the block 618 to a channel estimation block 650, which will be disclosed in more detail below. A signal $r_{S,1}(n)$ comprising modulated data from multiple transmit antennas and affected by the channel is provided from the block 618 to a block 620, where a Fast Fourier transformation (FFT) is performed. The block 620 provides a signal $R_{S,1}(k)$ for each receiving antenna y1, y2 ... yJ per OFDM symbol interval. The signal $R_{S,1}(k)$ is provided to a demodulation/decoding (DEMOD/DECODE) block 634, where channel equalization, de-interleaving, FEC (forward error correction) decoding and de-scrambling is provided.

In order to decode the data that will be sent, the channel need to be estimated. The channel estimation is made in the block 650. The signal $r_{P,1}(n)$ from block 618 is provided to a block 660, where a Fast Fourier Transformation (FFT) is performed resulting in a signal $R_{P,1}(k)$. The signal $R_{P,1}(k)$ is provided to a block 662, where the signal $R_{P,1}(k)$ is divided by a training symbol P(k) (/P(k)). The result from block 662 is provided to a block 664, where an Inverse Fast Fourier Transformation (IFFT) is performed. When the training symbol sequence arrives the time domain signal is switched into the channel estimation stage, where a composite channel impulse response h'(n) is extracted. The composite channel impulse response h'(n) is then fed from the block 664 to a block 666. In block 666, individual channel impulse responses (CIR) for this particular reception antenna y1 and all transmit antennas are then extracted and fed to the decoding/demodulation block 634. The decoding/demodulation block 634 uses the channel estimates when the signals $R_{S,1}(k)$, $R_{S,2}(k)$. . . . , $R_{S,J}(k)$ are processed. The signal processed in block 634 is then output 630 to higher layers.

Depending of the operation with respect to time or frequency in the decoding/demodulation block 634, it should be noted that often a frequency domain representation of the channel may be more suitable than the time domain oriented channel impulse response. Block 634 may for example use a frequency domain equalizer prior to Forward Error Correction decoding. Alternatively, block 634 may incorporate frequency domain channel state information in a Viterbi decoder's path metric when convolutional coding is employed. Hence, additional FFTs are required for this purpose. Furthermore, said operation is performed in parallel for potential multiple receiver antennas. It should also be noted that the Fast Fourier Transform function in block 620, 660 and additional blocks having an FFT mechanism of the same size may use the same hardware. It should be noted that the disclosed invention in addition to the channel estimate capability also enables single channel estimates from a single transmitter antenna. The Inverse Fast Fourier function may also use the same hardware with small alterations of involved multiplication factors.

What is claimed is:

1. A method in a wireless communication system comprising at least one transmitter provided with at least two antennas and at least one receiving unit provided with at least one antenna and wherein training sequences are transmitted from the at least two antennas of the at least one transmitter to the at least one antenna of the at least one receiving unit, characterized in that first, prior to the transmission, a training sequence P(k) is Inverse Discrete Fourier Transformed to a sequence p(n);

second, for each antenna branch the Inverse Discrete Fourier Transformed sequence p(n) is cyclically rotated by a predetermined step, said predetermined step being different for each antenna branch to generate cyclically rotated training sequences p(n−n1), p(n−n2);

third, the cyclically rotated training sequences p(n−n1), p(n−n2) are transmitted concurrently from said at least two antennas to the receiving unit; and fourth, at the receiving unit receiving the cyclically rotated training sequences, the received sequences being a superposition of transmitted training sequences, each individually affected by the propagation medium, are used to provide channel impulse response estimates for the transmission from respective antenna.

2. The method according to claim 1, characterized in that instead of an Inverse Discrete Fourier Transform, an Inverse Fast Fourier Transform is performed.

3. The method according to claim 1, characterized in that a cyclic extension having a predetermined length is added to each sequence prior the transmission, the cyclic extension being greater than a delay spread.

4. The method according to claim 1, characterized in that the distance between each predetermined step is greater than a delay spread.

5. The method according to claim 1, characterized in that at the receiving unit the received sequence in a first step, is Discrete Fourier Transformed and divided by the training sequence P(k), in a second step, the result from the first step is Inverse Discrete Fourier Transformed resulting in a sequence having distinctly separated regions in the time domain, the separated regions containing the respective channel impulse response estimates.

6. The method according to claim 2, characterized in that at the receiving unit the received sequence in a first step, is Fast Fourier Transformed and divided by the training sequence P(k), in a second step, the result from the first step is Inverse Fast Fourier Transformed resulting in a sequence having distinctly separated regions in the time domain, the separated regions containing the respective channel impulse response estimates.

7. The method according to claim 5, characterized in that fixed predetermined ranges are selected in the discrete time domain;

each range comprising one and only one of the above defined regions; and one channel impulse response is selected from each of said ranges.

8. The method according to claim 7, characterized in that each resulting channel impulse response is converted to the frequency domain by a DFT or FFT operation when an equalizer and FEC decoder configured to receive the impulse response operate in the frequency domain.

9. The method according to claim 5, characterized in that a window function is applied prior to the second step, wherein leakage inherent in the transformation in the first step is reduced.

10. The method according to claim 5, characterized in that a filter function is applied after the second step, wherein leakage inherent in the transformation in the first step is reduced.

11. The method according to claim 9, characterized in that said window function is a Hanning window.

12. The method according to claim 9, characterized in that an inverse impulse response corresponding to the window function is applied after the selection of said channel impulse response, wherein the phase and amplitude values are compensated due to the result from a preceding window.

13. The method according to claim 9, characterized in that an inverse function is applied after the conversion to the frequency domain by a DFT or FFT operation, wherein phase and amplitude values are compensated due to a result from a preceding window.

14. A wireless communication system, comprising:
at least one transmitter provided with at least two antennas; and,
at least one receiving unit provided with at least two antennas
wherein training sequences are transmitted from the at least two antennas of the at least one transmitter to the at least two antennas of the at least one receiving unit; wherein said wireless communication system is operative to:
first, prior to the transmission, a training sequence P(k) is Inverse Discrete Fourier Transformed to a sequence p(n);
second, for each antenna branch the Inverse Discrete Fourier Transformed sequence p(n) is cyclically rotated by a predetermined step (n1,n2), said predetermined step being different for each antenna branch to generate cyclically rotated training sequences p(n-n1), p(n-n2);
third, the cyclically rotated training sequences p(n-n1). p(n-n2) are transmitted concurrently from said at least two antennas to the receiving unit; and
fourth, at the receiving unit receiving the cyclically rotated training sequences, the received sequences being a superposition of cyclically rotated transmitted training sequences each individually affected by the propagation medium, are used to provide channel impulse response estimates for the transmission from respective antenna.

15. The system according to claim 14, characterized in that instead of an Inverse Discrete Fourier Transform, an Inverse Fast Fourier Transform is performed.

16. The system according to claim 14, characterized in that a cyclic extension having a predetermined length is added to each sequence prior the transmission, the cyclic extension being greater than a delay spread.

17. The system according to claim 14, characterized in that the distance between each said predetermined step is greater than a delay spread.

18. The system according to claim 14, characterized in that at the receiving unit the received sequence
is Discrete Fourier Transformed and divided by the training sequence P(k): and, the result is Inverse Discrete Fourier Transformed resulting in a sequence having distinctly separated regions in the time domain, the separated regions containing the respective channel impulse response estimates.

19. The system according to claim 15, characterized in that at the receiving unit the received sequence is Fast Fourier Transformed and divided by the training sequence P(k); and, the result is Inverse Fast Fourier Transformed resulting in a sequence having distinctly separated regions in the time domain, the separated regions containing the respective channel impulse response estimates.

20. The system according to claim 18, characterized in that
fixed predetermined ranges are selected in the discrete time domain;
each range comprising one and only one of the above defined regions; and
one channel impulse response is selected from each of said ranges.

21. An arrangement in a wireless communication system comprising at least one transmitter provided with at least two antennas and at least one receiving unit provided with at least two antennas and wherein
training sequences are transmitted from the at least two antennas of the at least one transmitter to the at least two antennas of the at least one receiver unit, characterized by
means for performing, prior to the transmission, an Inverse Discrete Fourier Transformation on a training sequence P(k) to produce a sequence p(n);
means for performing, for each antenna branch, a cyclic rotation by a predetermined step of the Inverse Discrete Fourier Transformed sequence, said predetermined step being different for each antenna branch to generate cyclically rotated training sequences p(n−n1), p(n−n2);
means for transmitting concurrently the cyclically rotated training sequences p(n- n1), p(n−n2) from said at least two antennas to the receiving unit; and
means for using, at the receiving unit receiving the cyclically rotated training sequences, the received sequences, being a superposition of cyclically rotated transmitted training sequences each individually affected by the propagation medium, to provide channel impulse response estimates for the transmission from respective antenna.

22. The arrangement according to claim 21, characterized in that instead of an Inverse Discrete Fourier Transform, an Inverse Fast Fourier Transform is performed.

23. The arrangement according to claim 21, further comprising means for adding a cyclic extension having a predetermined length to each sequence prior to the transmission, the cyclic extension being greater than a delay spread.

24. The arrangement according to claim 21, characterized in that the distance between each said predetermined step is greater than a delay spread.

25. The arrangement according to claim 21, characterized in that the receiving unit comprises means for:
performing a Discrete Fourier Transform and a division of the received sequence by the training sequence P(k); and
performing an Inverse Discrete Fourier Transform of the result, resulting in a sequence having distinctly separated regions in the time domain, the separated regions containing the respective channel impulse response estimates.

26. The arrangement according to claim 2, characterized in that the receiving unit comprises means for:
performing a Fast Fourier Transform and a division of the received sequence by the training sequence P(k); and,
performing an Inverse Fast Fourier Transform of the result, resulting in a sequence having distinctly separated regions in the time domain, the separated regions containing the respective channel impulse response estimates.

27. The arrangement according to claim 25, characterized in that the receiving unit comprises means for selecting fixed predetermined ranges in the discrete time domain, each range comprising one and only one of the above defined regions; and means for selecting one channel impulse response from each of said ranges.

* * * * *

UNITED STATES PATENT AND TRADEMARK OFFICE
CERTIFICATE OF CORRECTION

PATENT NO.       : 7,082,159 B2
APPLICATION NO.  : 09/995759
DATED            : July 25, 2006
INVENTOR(S)      : Larsson It is certified that error appears in the above-identified patent and that said Letters Patent is hereby corrected as shown below:

On the Title Page, Item (56), under "U.S. PATENT DOCUMENTS", in Column 1, Line 7, delete "B1" and insert -- B2 --, therefor.

On the Title Page, Item (57), under "Abstract", in Column 2, Lines 12-13, after "being" delete "p(n) is cyclically rotated by a predetermined step, said predetermined step being".

In Column 1, Line 15, delete "bandwith" and insert -- bandwidth --, therefor.

In Column 1, Line 32, delete "bandwith" and insert -- bandwidth --, therefor.

In Column 2, Line 3, delete "bandwith" and insert -- bandwidth --, therefor.

In Column 2, Line 10, delete "bandwith" and insert -- bandwidth --, therefor.

In Column 2, Line 13, delete "bandwith" and insert -- bandwidth --, therefor.

In Column 4, Line 39, after "Chicago" delete "Ill" and insert -- IL --, therefor.

In Column 6, Line 22, delete "bandwith" and insert -- bandwidth --, therefor.

In Column 6, Line 33, delete "space(-time)" and insert -- space-time --, therefor.

In Column 6, Line 38, after "increase" delete "bandwith" and insert -- bandwidth --, therefor.

In Column 6, Line 44, after "very" delete "bandwith" and insert -- bandwidth --, therefor.

In Column 6, Line 65, delete "bandwith" and insert -- bandwidth --, therefor.

In Column 7, Line 11, after "sequence" delete "P(K)" and insert -- P(k) --, therefor.

In Column 9, Line 6, delete "(DIA)" and insert -- (D/A) --, therefor.

In Column 9, Line 7, delete "analogue" and insert -- analog --, therefor.

In Column 9, Line 17, after "$r_1(n)=p(n)*h_{11}(n)+p(n-n')*h_{21}(n)+v_1(n)$" insert -- , where --.

In Column 9, Line 30, delete "K" and insert -- k --, therefor.

UNITED STATES PATENT AND TRADEMARK OFFICE
CERTIFICATE OF CORRECTION

PATENT NO. : 7,082,159 B2
APPLICATION NO. : 09/995759
DATED : July 25, 2006
INVENTOR(S) : Larsson It is certified that error appears in the above-identified patent and that said Letters Patent is hereby corrected as shown below:

In Column 12, Lines 7-8, delete "$H_{comp}(n)=h_{11}(n-n')+h_{21}(n-n_2')+h_{31}(n-n_3')+h_{41}(n-n-n')+w_1(n)$" and
insert -- $H_{comp}(n)=h_{11}(n-n')+h_{21}(n-n_2')+h_{31}(n-n_3')+h_{41}(n-n_4')+w_1(n)$ --, therefor.

In Column 12, Lines 12–13, delete "durat" and insert -- duration. --, therefor.

In Column 12, Line 12, delete "duration" and insert -- duration. --, therefor.

In Column 12, Line 60, delete "(OP)" and insert -- (CP) --, therefor.

In Column 13, Line 19, after "arrives" insert -- , --.

In Column 13, Line 29, delete "(k)." and insert -- (k), --, therefor.

In Column 15, Line 10, in Claim 14, after "antennas" insert -- : --.

In Column 15, Line 19, in Claim 14, after "branch" insert -- , --.

In Column 15, Line 24, in Claim 14, delete "p(n-n 2)" and insert -- p(n-n2) --, therefor.

In Column 15, Line 26, in Claim 14, delete "n1)." and insert -- n1), --, therefor.

In Column 15, Line 26, in Claim 14, delete "p(n-n 2)" and insert -- p(n-n2) --, therefor.

In Column 15, Line 48, in Claim 18, delete "P(k):" and insert -- P(k); --, therefor.

UNITED STATES PATENT AND TRADEMARK OFFICE
CERTIFICATE OF CORRECTION

PATENT NO. : 7,082,159 B2
APPLICATION NO. : 09/995759
DATED : July 25, 2006
INVENTOR(S) : Larsson It is certified that error appears in the above-identified patent and that said Letters Patent is hereby corrected as shown below:

In Column 16, Line 49, in Claim 26, delete "claim 2" and insert -- claim 22 --, therefor.

Signed and Sealed this

Eleventh Day of December, 2007

JON W. DUDAS
*Director of the United States Patent and Trademark Office*